(12) United States Patent
Bae et al.

(10) Patent No.: US 9,488,874 B2
(45) Date of Patent: Nov. 8, 2016

(54) LIQUID CRYSTAL DISPLAY

(71) Applicant: Samsung Display Co., Ltd., Yongin, Gyeonggi-Do (KR)

(72) Inventors: Kwang Soo Bae, Yongin-si (KR); Sung Woo Cho, Suwon-si (KR); Yeun Tae Kim, Hwaseong-si (KR); Sung Hwan Won, Suwon-si (KR)

(73) Assignee: Samsung Display Co., Ltd. (KR)

( * ) Notice: Subject to any disclaimer, the term of this patent is extended or adjusted under 35 U.S.C. 154(b) by 105 days.

(21) Appl. No.: 14/523,211

(22) Filed: Oct. 24, 2014

(65) Prior Publication Data

US 2016/0004112 A1    Jan. 7, 2016

(30) Foreign Application Priority Data

Jul. 1, 2014    (KR) .................. 10-2014-0081872

(51) Int. Cl.
*G02F 1/1339*    (2006.01)
*G02F 1/1341*    (2006.01)
*G02F 1/1337*    (2006.01)

(52) U.S. Cl.
CPC ......... *G02F 1/13394* (2013.01); *G02F 1/1337* (2013.01); *G02F 1/1341* (2013.01)

(58) Field of Classification Search
CPC ................. G02F 1/13394; G02F 1/1341
USPC ........................ 349/156, 154, 189
See application file for complete search history.

(56) References Cited

U.S. PATENT DOCUMENTS

| | | | | |
|---|---|---|---|---|
| 2003/0128309 A1* | 7/2003 | Yamada | ........... | G02F 1/13394 349/106 |
| 2004/0080720 A1* | 4/2004 | Saito | ........... | A47B 37/02 353/79 |
| 2004/0257518 A1* | 12/2004 | Jang | ........... | G02F 1/1341 349/155 |

FOREIGN PATENT DOCUMENTS

| | | |
|---|---|---|
| KR | 100406779 B1 | 11/2003 |
| KR | 1020070017710 A | 2/2007 |
| KR | 100797095 B1 | 1/2008 |
| KR | 1020090117242 A | 11/2009 |
| KR | 1020130134153 A | 12/2013 |
| KR | 1020140006588 A | 1/2014 |

* cited by examiner

*Primary Examiner* — Thanh-Nhan P Nguyen
(74) *Attorney, Agent, or Firm* — Innovation Counsel LLP (57) ABSTRACT

Provided is a liquid crystal display. The liquid crystal display comprises a substrate having a plurality of pixel areas; a first electrode on the substrate in each of the pixel areas; a fine space layer positioned on the first electrode; a roof layer defining the fine space layer between the substrate and the roof layer and including a liquid crystal injection port; a second electrode on a bottom surface of the roof layer; and a supporter on the liquid crystal injection port and divided into a plurality of portions to define a filling space.

19 Claims, 10 Drawing Sheets

LIQUID CRYSTAL DISPLAY

CROSS-REFERENCE TO RELATED APPLICATIONS

This application is based on and claims priority from Korean Patent Application No. 10-2014-0081872, filed on Jul. 1, 2014 in the Korean Intellectual Property Office, the disclosure of which is incorporated herein in its entirety by reference.

BACKGROUND

1. Field

The present application relates to a liquid crystal display.

2. Description of the Prior Art

A liquid crystal display, which is one of display devices that have widely been used, is a display device that can adjust the quantity of penetrating light by applying a voltage to two opposite electrodes (a pixel electrode and a common electrode) and controlling an arrangement of liquid crystal molecules of a liquid crystal layer interposed between the two electrodes.

Typically, a liquid crystal display has been fabricated to include two substrates and a liquid crystal layer. Recently, however, in order to simplify the fabricating process thereof, the liquid crystal display has also been fabricated to include one substrate and a liquid crystal layer.

As an example, the liquid crystal display has been fabricated in a manner that a sacrificial layer and a roof layer are formed on one substrate, the sacrificial layer is removed, and then an alignment material and liquid crystals are injected into a fine space layer that is formed through removal of the sacrificial layer.

SUMMARY

On the other hand, the liquid crystal display includes a liquid crystal injection port that is formed on one side surface or both side surfaces of the roof layer to inject the alignment material and the liquid crystals into the fine space layer. A supporter is formed on a portion of the liquid crystal injection port as one column to prevent the roof layer of the portion of the liquid crystal injection port from drooping due to gravity.

However, in the process of injecting the alignment material that includes a solid content and a solvent into the fine space layer through the liquid crystal injection port and drying the injected alignment material, a large amount of the solid content of the alignment material comes in contact with an outer surface of the supporter due to surface tension to cause the alignment layer to make a lump. In this case, if the solid content of the alignment material is accumulated on the outer surface of the supporter too thickly, the aperture ratio of a pixel area may be decreased to lower the transmission rate of the pixel area.

Accordingly, one embodiment provides a liquid crystal display, which can reduce deterioration of the transmission rate that is caused by the decrease of the aperture ratio of a pixel area due to lumping of an alignment layer.

Additional features of the inventive concept will be set forth in part in the description which follows and in part will become apparent to those having ordinary skill in the art upon examination of the following or may be learned from practice of the inventive concept.

In one embodiment, there is provided a liquid crystal display comprising: a substrate having a plurality of pixel areas; a first electrode on the substrate in each of the pixel areas; a fine space layer positioned on the first electrode; a roof layer defining the fine space layer between the substrate and the roof layer and including a liquid crystal injection port; a second electrode on a bottom surface of the roof layer; and a supporter on the liquid crystal injection port layer and divided into a plurality of portions to define a filling space.

The liquid crystal display may further comprise an alignment layer inside the fine space layer, wherein the alignment layer may include a main alignment layer covering the first electrode and the second electrode, and a surplus alignment layer filling in the filling space and surrounding outer surfaces of the portions.

Each of the portions may be in a rectangular prism shape.

The portions may be a same size.

Each of the portions may have a horizontal length and a vertical length on a plane, and the horizontal length of each of the portions may be twice the vertical length of each of the portions.

The horizontal length of each of the portions may be 5 μm, and the vertical length of each of the portions may be 2.5 μm.

Outer surfaces of the portions may define one rectangle, and a gap distance between adjacent portions may be shorter than the horizontal length and the vertical length of each of the portions.

The filling space may have a cross shape on the plane.

The supporter may be arranged in a center or on both sides of the liquid crystal injection port.

The liquid crystal injection port may be on one side surface or both side surfaces of the roof layer in the each of the pixel areas.

The number of the portions may be four or more.

Each of the portions may be in a cylindrical shape.

The supporter may be integral with the roof layer.

The liquid crystal display may further comprise a thin film transistor electrically connected to the first electrode on the substrate, wherein the liquid crystal injection port may be positioned on a transistor forming area in which the thin film transistor is positioned.

In another embodiment, there is provided a liquid crystal display comprising: a first display layer having a plurality of pixel areas and a first electrode in each of the pixel areas; a second display layer facing the first display layer and having a second electrode thereon; and a supporter between the first display layer and the second display layer, arranged in each of the pixel areas, and divided into a plurality of portions to define a filling space.

The liquid crystal display may further comprise an alignment layer between the first display layer and the second display layer, wherein the alignment layer may include a main alignment layer covering the first electrode and a surplus alignment layer filling in the filling space and surrounding outer surfaces of the portions.

One or more supporters may be arranged in the each of the pixel areas.

Each of the portions may be in a rectangular prism shape.

Each of the portions may have a horizontal length and a vertical length on a plane, outer surfaces of the portions may define one rectangle, and a gap distance between adjacent portions may be shorter than a horizontal length and a vertical length of each of the portions.

The filling space may have a cross shape on a plane.

According to the embodiments, at least the following effects can be achieved.

According to the liquid crystal display according to an embodiment, the supporter that is formed to be divided into the plurality of portions to define the filling space is arranged on the liquid crystal injection port of the roof layer. Thus, the solid content of the alignment material can fill in the filling space of the supporter in the process of injecting the alignment material that includes the solid content and the solvent into the fine space layer through the liquid crystal injection port and drying the injected alignment material.

Accordingly, it can be reduced that the large amount of the solid content of the alignment material comes in contact with the outer surface of the supporter due to the surface tension to cause the alignment layer to make a lump. Accordingly, it can be reduced that the solid content of the alignment material is accumulated on the outer surface of the supporter too thickly, and thus the decrease of the aperture ratio of the pixel area and deterioration of the transmission rate can be reduced.

The effects according to the inventive concept are not limited to the contents as exemplified above, but further various effects are included in the description.

BRIEF DESCRIPTION OF THE DRAWINGS

The above and other features of the inventive concept will be more apparent from the following detailed description taken in conjunction with the accompanying drawings, in which.

DETAILED DESCRIPTION OF THE EMBODIMENTS

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims.

It will also be understood that when a layer is referred to as being "on" another layer or substrate, it can be directly on the other layer or substrate, or intervening layers may also be present. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the inventive concept.

Hereinafter, embodiments will be described with reference to the accompanying drawings.

Figure 1:
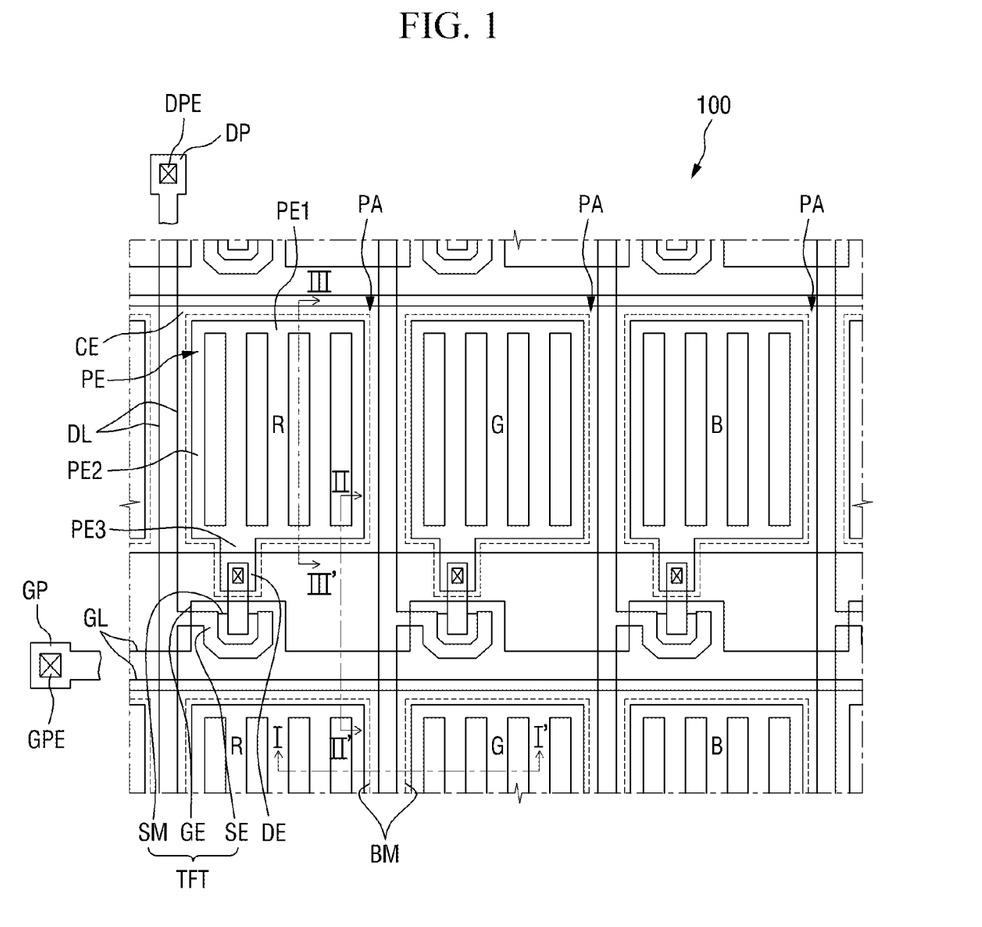
FIG. 1 is a plan view of a liquid crystal display according to an embodiment.
Figure 2:
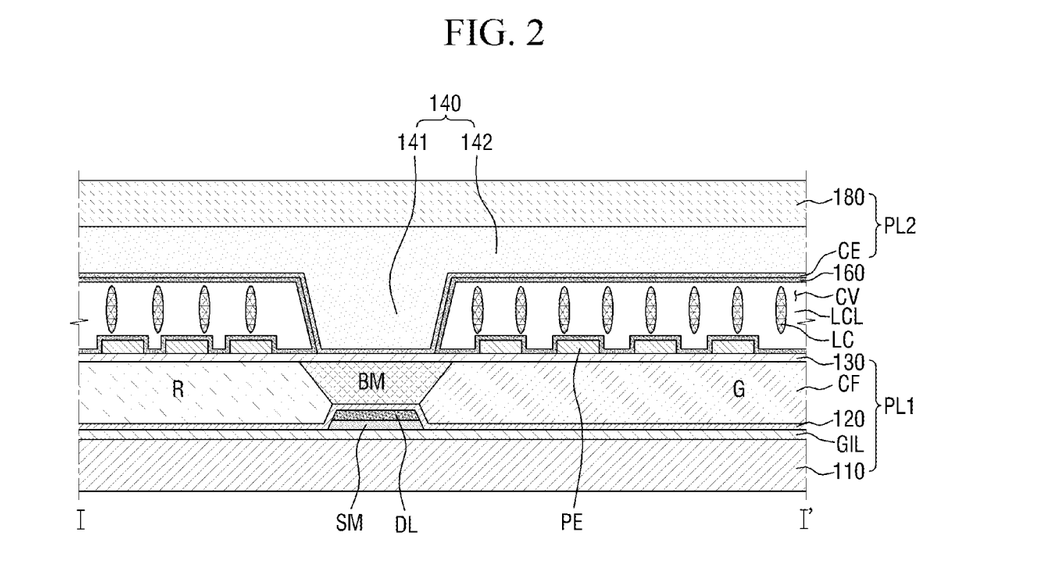
FIG. 2 is a cross-sectional view of the liquid crystal display taken along line I-I' of FIG. 1.
Figure 3:
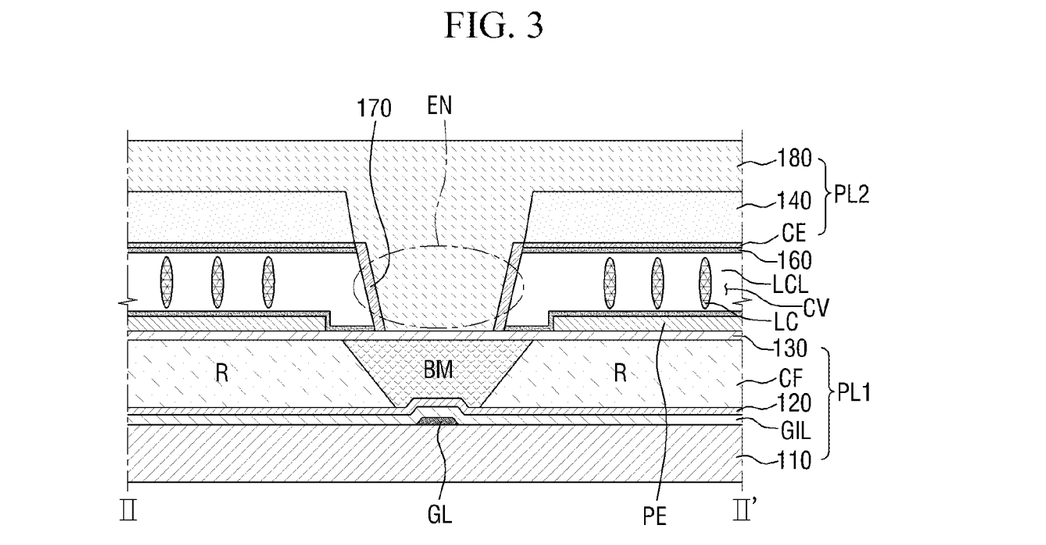
FIG. 3 is a cross-sectional view of the liquid crystal display taken along line II-IF of FIG. 1.
Figure 4:
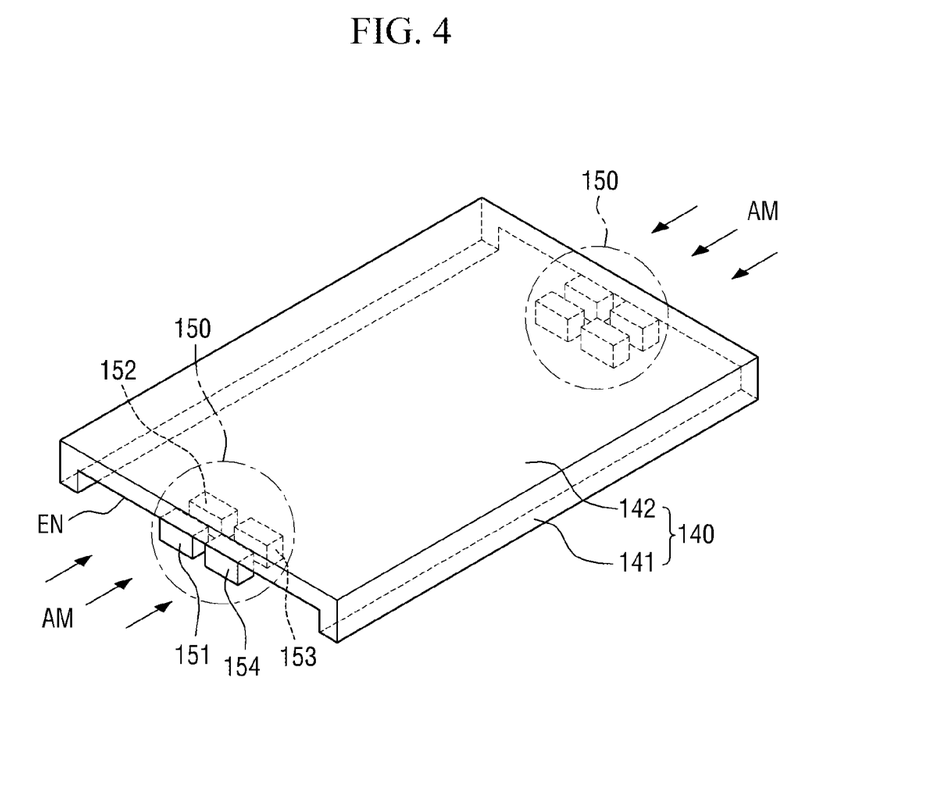
FIG. 4 is a perspective view illustrating a liquid crystal injection portion and a supporter of a roof layer of FIG. 2 in one pixel area.
Figure 5:
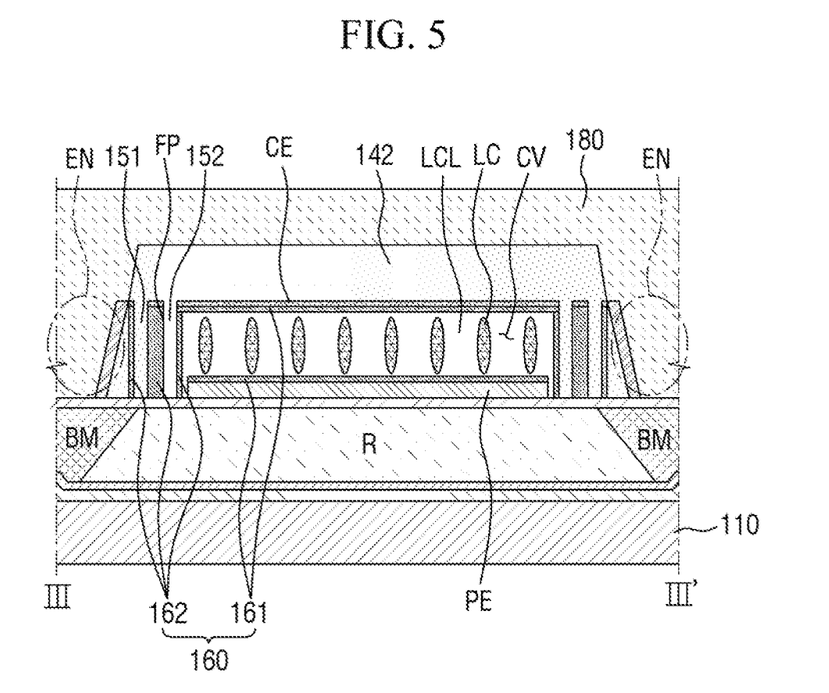
FIG. 5 is a cross-sectional view taken along line of FIG. 1 to show a portion that corresponds to one pixel area of FIG. 4.

FIG. 1 is a plan view of a liquid crystal display according to an embodiment. FIG. 2 is a cross-sectional view of the liquid crystal display taken along line I-I' of FIG. 1, and FIG. 3 is a cross-sectional view of the liquid crystal display taken along line II-II' of FIG. 1. FIG. 4 is a perspective view illustrating a liquid crystal injection portion and a supporter of a roof layer of FIG. 2 in one pixel area, and FIG. 5 is a cross-sectional view taken along line of FIG. 1 to show a portion that corresponds to one pixel area of FIG. 4.

Referring to FIGS. 1 to 5, a liquid crystal display 100 briefly includes a first display layer PL1 having a plurality of pixel areas in which pixel electrodes (also referred to as "first electrodes") PE are respectively formed, a second display layer PL2 facing the first display layer PL1 and having a common electrode (also referred to as a "second electrode") CE, and a supporter 150 positioned at the same level as the level of a liquid crystal layer LCL that is formed between the first display layer PL1 and the second display layer PL2.

Specifically, the liquid crystal display 100 may include a substrate 110, a gate line GL, a data line DL, a gate insulating layer GIL, a thin film transistor TFT, an insulating layer 120, color filters CF, a black matrix BM, a first protection layer 130, a pixel electrode PE, a fine space layer CV, a roof layer 140, the common electrode (also referred to as a "second electrode") CE, the supporter 150, an alignment layer 160, the liquid crystal layer LCL, a sealing layer 170, and a capping layer 180.

The substrate 110 may be a transparent insulating substrate, and may have a plurality of pixel areas PA that are defined by the gate line GL and the data line DL.

The gate line GL is formed on the substrate 110 to extend in a first direction, and transfer a gate signal. A gate pad GP is connected to one end of the gate line GL. A gate pad electrode GPE may be formed on the gate pad GP. The gate pad electrode GPE is a contact electrode that connects an external wiring for applying a signal to the pixel electrode PE.

The data line DL is formed on the substrate 110 to extend in a second direction that crosses the first direction, is isolated from the gate line GL, and transfers a data signal. A data pad DP is connected to one end of the data line DL. A data pad electrode DPE may be formed on the data pad DP. The data pad electrode DPE is another contact electrode that connects an external wiring for applying a signal to the pixel electrode PE.

The gate insulating layer GIL covers the gate line GL formed on the surface of the substrate 110 and the gate pad GP, and is formed of an insulating material. For example, the gate insulating layer GIL may include silicon nitride or silicon oxide. On the other hand, the data line DL and the data pad DP may be formed on the gate insluting layer GIL.

The thin film transistor TFT includes a gate electrode GE, a semiconductor layer SM, a source electrode SE, and a drain electrode DE.

The gate electrode GE may be formed to project from the gate line GL toward the semiconductor layer SM on plane. The gate electrode GE may include any one of indium tin oxide (ITO), indium zinc oxide (IZO), and indium tin zinc oxide (ITZO). Further, the gate electrode GE may have a two-layer structure including a first electrode layer made of the above-described material and a second electrode layer made of a material to be described later. The second electrode layer may be made of a metal, such as copper (Cu), molybdenum (Mo), aluminum (Al), tungsten (W), chrome (Cr), or titanium (Ti), or an alloy including at least one of the above-described metals.

The semiconductor layer SM is formed on the gate electrode GE on the intervention of the gate insulating layer GIL. The semiconductor layer SM may include an active layer provided on the gate insulating layer GIL and an ohmic contact layer provided on the active layer. On the other hand the semiconductor layer SM may be formed between the data line DL and the gate insulating layer GIL. Further, the semiconductor layer SM may also be formed between the data pad DP and the gate insulating layer GIL.

The source electrode SE is formed to project from the data line DL, and overlaps at least a part of the gate electrode GE on a plane. The drain electrode DE is formed to be spaced apart from the source electrode SE, and overlaps at least a part of the gate electrode GE on a plane. The source electrode SE and the drain electrode DE may be made of a metal, such as copper, molybdenum, aluminum, tungsten, chrome, or titanium, or an alloy including at least one of the above-described metals. Here, the source electrode SE and the drain electrode DE overlap a part of the semiconductor layer SM in an area other than an area where the source electrode SE and the drain electrode DE are spaced apart from each other.

The insulating layer 120 is formed on the gate insulating layer GIL, and may have through-holes for exposing the drain electrode DE, the gate pad GP, and the data pad DP. The insulating layer 120 may include, for example, silicon nitride or silicon oxide.

The color filters CF are formed on the insulating layer 120 corresponding to the respective pixel areas PA. The color filter CF is to provide a color to light that penetrates the liquid crystal layer LCL, and may display one of a red filter (R), a green filter (G), and a blue filter (B). However, the color filter CF is not limited to the above-described color filter.

The black matrix BM may be formed on the insulating layer 120 at the edge of each pixel area PA. That is, the black matrix BM may be arranged to surround the color filters CF. The black matrix BM may overlap the data line DL and the thin film transistor TFT. The black matrix BM is formed of a light interception material and intercepts unnecessary light in implementing an image. For example, the black matrix BM may intercept light leakage, which may occur at the edge of the liquid crystal layer LCL due to an abnormal behavior of liquid crystal molecules LC, or color mixture, which may appear at edges of the color filters CF.

The first protection layer 130 is formed on the color filters CF and the black matrix BM, and may serve to planarize the color filters CF and the black matrix BM. Further, the first protection layer 130 may protect the color filters CF and the black matrix BM, and reduce damage of the color filters CF and the black matrix BM due to an $O_2$ ashing process for finally removing the remainders in the fine space layer CV in a process of forming the fine space layer CV into which the liquid crystal molecules LC are injected. The first protection layer 130 may be formed of at least one of SiNx, SiOx, and SiOxNy.

The pixel electrode PE is formed on the substrate 110, and specifically, on the first protection layer 130 in each of the pixel areas PA, and is connected to the drain electrode DE. The pixel electrode PE includes at least one trunk electrode PE1, a plurality of branch electrodes PE2 formed to project from the trunk electrode PE1, and a connection electrode PE3 connecting the trunk electrode PE1 and the drain electrode DE to each other. The branch electrodes PE2 are spaced apart for a predetermined distance and are separated from each other. The branch electrodes PE2 may be formed to extend in parallel in a predetermined direction. The trunk electrode PE1 and the branch electrodes PE2 are not limited to the arrangement as illustrated in FIG. 1, but may have various arrangements. The pixel electrode PE may be formed of a transparent conductive material, for example, indium tin oxide (ITO) or indium zinc oxide (IZO).

The fin space layer CV is positioned on the pixel electrode PE. The fine space layer CV may be formed by forming the roof layer 140 on a sacrificial layer (not illustrated) that is formed for each pixel area PA and then removing the sacrificial layer. The fine space layer CV provides a space in which the alignment layer 160 and the liquid crystal layer LCL are formed.

The roof layer 140 may be formed so that the fine space layer CV is formed between the roof layer 140 and the substrate 110. For example, the roof layer 140 may include side walls 141 formed on the substrate 110 to partition the plurality of pixel areas, and a planarization portion 142 formed on the side walls 141 to connect side walls 141 to each other. The roof layer 140 may be formed of an organic material or an inorganic material. The inorganic material may include, for example, at least one of SiNx, SiOx, and SiOxNy.

The roof layer 140 is formed along the first direction of the substrate 110, and may further include a liquid crystal injection port EN positioned in a portion that overlaps the gate line GL. Specifically, the liquid crystal injection port EN may be formed in a transistor area in which a thin film transistor TFT is formed. Further, the liquid crystal injection port EN may be formed on one side surface or both side surfaces of the roof layer 140. The liquid crystal injection port EN as described above may enable an alignment material AM and the liquid crystal molecules LC to be injected into the fine space layer CV, and may be used when the sacrificial layer for forming the fine space layer CV is removed.

The common electrode CE may be formed on the bottom surface of the roof layer 140, come in contact with the first protection layer 130 on the bottom surfaces of the side walls 141, and be formed to be spaced apart from the pixel electrode PE on the bottom surfaces of the planarization portion 142. The common electrode CE may be formed of a transparent conductive material, for example, indium tin oxide (ITO) or indium zinc oxide (IZO), and serve to control the alignment direction of the liquid crystal molecules LC through generation of an electric field together with the pixel electrode PE. On the other hand, a part of the common electrode CE may be removed to form a part of the liquid crystal injection port EN.

The supporter 150 may be formed on a portion of the liquid crystal injection port EN of the roof layer 140 to support the roof layer 140, and may prevent the roof layer 140 on the portion of the liquid crystal injection port EN from drooping due to gravity. Further, in the process of injecting the alignment material AM that includes the solid content and the solvent into the fine space layer CV through the liquid crystal injection port EN and drying the injected alignment material, the supporter 150 may make the solid content of the alignment material AM fill in a filling space FP (in FIG. 6) of the supporter 150. Thus, it can be reduced that a large amount of the solid content of the alignment material AM comes in contact with the outer surface of the supporter 150 due to the surface tension of the supporter 150 to cause the alignment material AM to make a lump. The supporter 150 may be integrally formed with the roof layer 140, and may be arranged in a center portion of the liquid crystal injection port EN. On the other hand, FIGS. 4 and 5 illustrate that the liquid crystal injection port EN is formed on both side surfaces of the roof layer 140 in each of the pixel areas PA and two supporters 150 are arranged in each of the pixel areas PA. However, if the liquid crystal injection port EN is formed on one side surface of the roof layer 140 in each of the pixel areas PA, one supporter 150 may be arranged in each of the pixel areas PA. That is, one or more supporters 150 may be arranged in each of the pixel areas PA. Hereinafter, the supporter 150 will be described in detail.

The alignment layer 160 is formed inside the fine space layer CV. Specifically, the alignment layer 160 includes a main alignment layer 161 that covers the pixel electrode PE and the common electrode CE and a surplus alignment layer 162 that comes in contact with the outer surface of the supporter 150 and fills in the filling space FP of the supporter 150. The alignment layer 160 may be formed by injecting an alignment material, such as polyamic acid, polysiloxane, or polyimide, into the fine space layer CV using a capillary force.

The liquid crystal layer LCL may be formed by injecting the liquid crystal molecules LC into the fine space layer CV using the capillary force. The liquid crystal molecules LC may be aligned by the alignment layer 160.

The sealing layer 170 is formed to seal the liquid crystal injection port EN of the fine space layer CV. The sealing layer 170 may be formed of a sealing material that does not react on the liquid crystal molecules LC injected into the fine space layer CV.

The capping layer 180 may be formed on the roof layer 140 and serve to planarize and protect other constructions positioned on a lower portion of the capping layer 180. The capping layer 180 may be formed of an insulating material. On the other hand, the capping layer 180 may be formed to seal the liquid crystal injection port EN of the fine space layer CV. In this case, the sealing layer 170 may be omitted.

Next, the supporter 150 will be described in detail.

Figure 6:
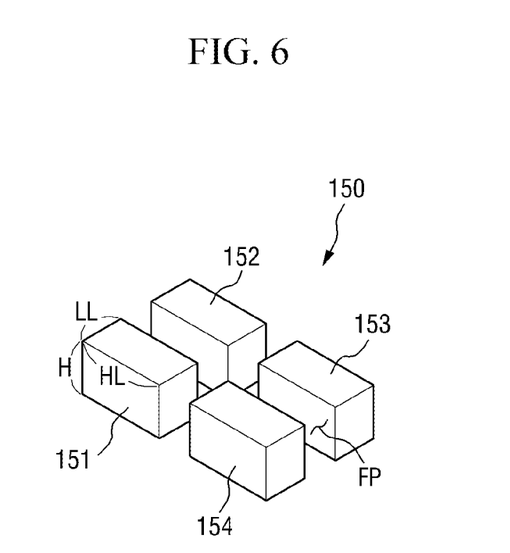
FIG. 6 is a perspective view of the supporter illustrated in FIG. 4.
Figure 7:
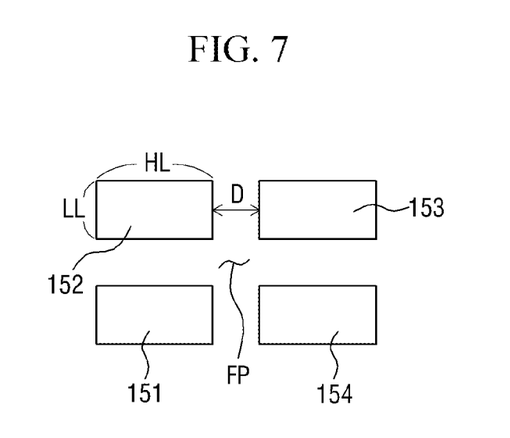
FIG. 7 is a plan view of the supporter illustrated in FIG. 4.
Figure 8:
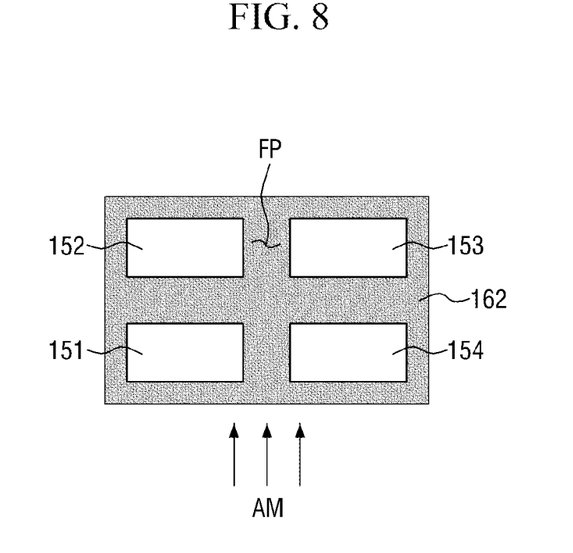
FIG. 8 is a plan view showing that a surplus alignment layer fills in the supporter illustrated in FIG. 4.

FIG. 6 is a perspective view of the supporter 150 illustrated in FIG. 4, and FIG. 7 is a plan view of the supporter 150 illustrated in FIG. 4. FIG. 8 is a plan view showing that a surplus alignment layer 162 fills in the supporter 150 illustrated in FIG. 4.

Referring to FIGS. 6 and 7, the supporter 150 is formed to be divided into a plurality of portions to define the filling space FP. As illustrated in FIG. 7, the filling space FP has a cross shape on a plane. For example, the supporter 150 includes four portions which are spaced apart for a predetermined gap distance D from each other, i.e., a first portion 151, a second portion 152, a third portion 153, and a fourth portion 154.

Each of the first to four portions 151 to 154 may be formed in a rectangular prism shape with the same size. Each of the first to fourth portions 151 to 154 may have a horizontal length HL, a vertical length LL, and a height H.

The horizontal length HL of each of the first to fourth portions 151 to 154 may be twice the vertical length LL thereof. The height H of each of the first to fourth portions 151 to 154 may be the same as the height between the first protection layer 130 (in FIG. 5) and the planarization portion 142 of the roof layer 140. For example, the horizontal length HL may be about 5 μm, the vertical length LL may be about 2.5 μm, and the height H may be about 3 μm.

The outer surfaces of the first to fourth portions 151 to 154 define one rectangle, and the gap distance D between adjacent portions (e.g., the second portion 152 and the third portion 153) may be smaller than the horizontal length HL and the vertical length LL of the first to fourth portions 151 to 154. For example, the gap distance D may be about 2 μm. In this case, when the alignment material AM is injected into the fine space layer CV (in FIG. 5) through the liquid crystal injection port EN (in FIG. 5), as illustrated in FIG. 8, the solid content of the alignment material AM may fill in the filling space FP of the supporter 150 by the capillary force. Accordingly, the solid content of the alignment material AM comes in contact with the outer surfaces of the first to fourth portions 151 to 154, but is not accumulated thickly. Accordingly, it can be reduced that the solid content of the alignment material AM is accumulated on the outer surface of the supporter 150 too thickly, and thus the decrease of the aperture ratio of the pixel area PA and deterioration of the transmission rate can be reduced.

Next, various examples of the supporter will be described.

Figure 9:
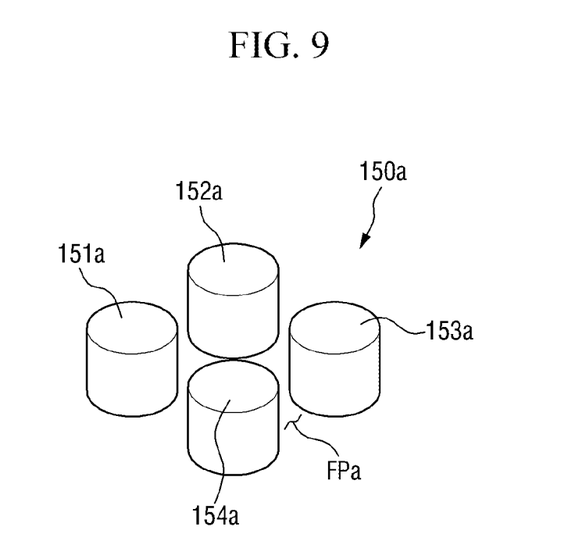
FIG. 9 is a perspective view showing another example of a supporter similar to the supporter illustrated in FIG. 6.
Figure 10:
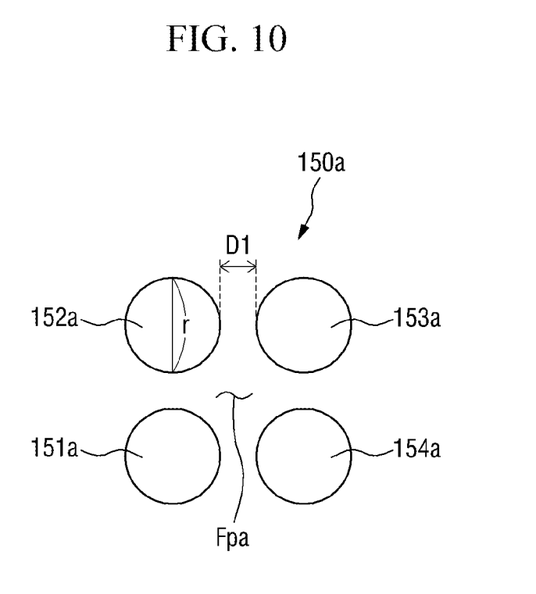
FIG. 10 is a plan view of the supporter illustrated in FIG. 9.
Figure 11:
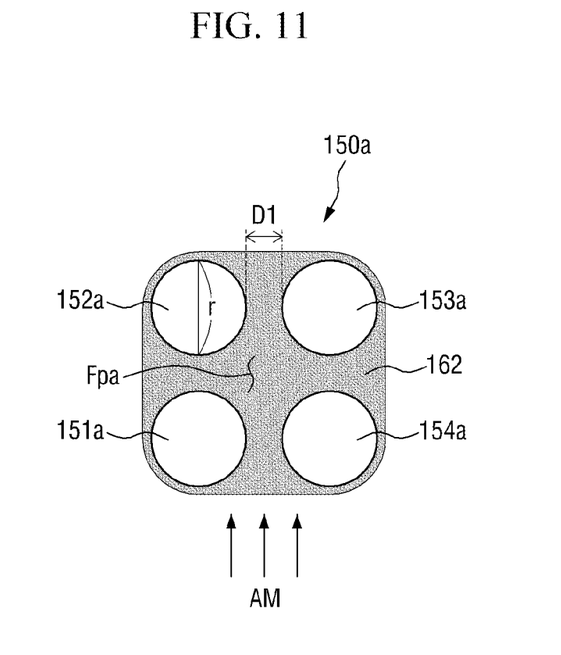
FIG. 11 is a plan view showing that a surplus alignment layer fills in the supporter of FIG. 9.

FIG. 9 is a perspective view showing another example of a supporter 150a similar to the supporter 150 illustrated in FIG. 6. FIG. 10 is a plan view of the supporter 150a illustrated in FIG. 9. FIG. 11 is a plan view showing that a surplus alignment layer 162 fills in the supporter 150a of FIG. 9.

Referring to FIG. 9, it is exemplified that the supporter 150a includes four portions which are spaced apart for a predetermined gap distance D1 from each other, i.e., a first portion 151a, a second portion 152a, a third portion 153a, and a fourth portion 154a, and each of the first to fourth portions 151a to 154a is formed in a cylindrical shape. In this case, the gap distance D1 between adjacent portions (e.g., the second portion 152a and the third portion 153a) may be smaller than the diameter r of each of the first to fourth portions 151a to 154a.

If each of the first to fourth portions 151a to 154a is formed in a cylindrical shape, a filling space FPa that is defined by the first to fourth portions 151a to 154a may be larger than the filling space FP of FIG. 6.

Accordingly, when the alignment material AM is injected into the fine space layer CV (in FIG. 5) through the liquid crystal injection port EN (in FIG. 5), as illustrated in FIG. 11, the solid content of the alignment material AM may mostly fill in the filling space FPa of the supporter 150a. The solid content of the alignment material AM may be accumulated on the outer surfaces of the first to fourth portions 151a to 154a with a thin thickness or may be scarcely accumulated. Accordingly, it can be reduced that the solid content of the alignment material AM is thickly accumulated on the outer surface of the supporter 150a, and thus the decrease of the aperture ratio of the pixel area PA and deterioration of the transmission rate can be reduced. In FIG. 11, the layer that is formed by filling the solid content of the alignment material AM in the filling space FPa of the supporter 150a may be a surplus alignment layer 162.

Figure 12:
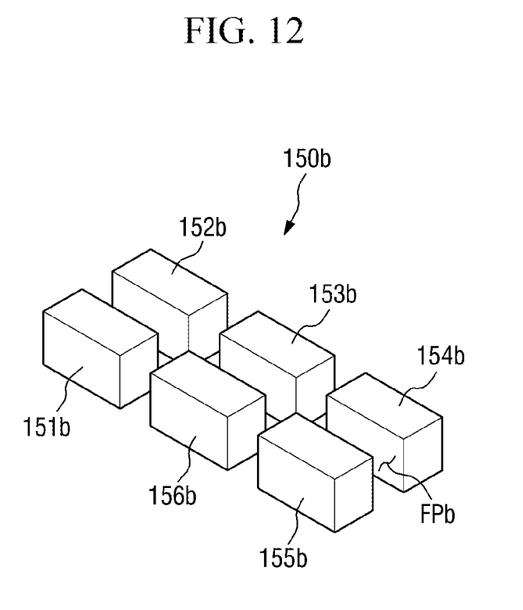
FIG. 12 is a perspective view showing still another example of a supporter similar to the supporter illustrated in FIG. 6.

FIG. 12 is a perspective view showing still another example of a supporter 150b similar to the supporter 150 illustrated in FIG. 6.

FIG. 12 exemplifies that the supporter 150b is formed to be divided into six portions to define a filling space FPb. That is, the supporter 150b includes a first portion 151b, a second portion 152b, a third portion 153b, a fourth portion 154b, a fifth portion 155b, and a sixth portion 156b.

The size of each of the first to sixth portions 151b to 156b may be equal to the size of each of the first to fourth portions 151 to 154 of FIG. 6. Further, in the supporter 150b, a gap distance between adjacent portions (e.g., the second portion 152b and the third portion 153b) may be equal to the gap distance D of the supporter 150 in FIG. 6.

Since the supporter 150b has the six portions 151b to 156b, the filling space FPb that is defined by the first to sixth portions 151b to 156b may be larger than the filling space FP illustrated in FIG. 6.

Accordingly, when the alignment material AM is injected into the fine space layer CV (in FIG. 5) through the liquid crystal injection port EN (in FIG. 5), the solid content of the alignment material AM may mostly fill in the filling space FPb of the supporter 150b, and may be scarcely accumulated on the outer surfaces of the first to sixth portions 151b to 156b. Accordingly, it can be reduced that the solid content of the alignment material AM is thickly accumulated on the outer surface of the supporter 150b, and thus the decrease of the aperture ratio of the pixel area PA and deterioration of the transmission rate can be reduced.

On the other hand, although FIGS. 6 and 12 illustrate that the number of portions of the supporter 150a or 150b is four or six, a larger number of portions may be provided in a supporter in accordance with various embodiments.

Figure 13:
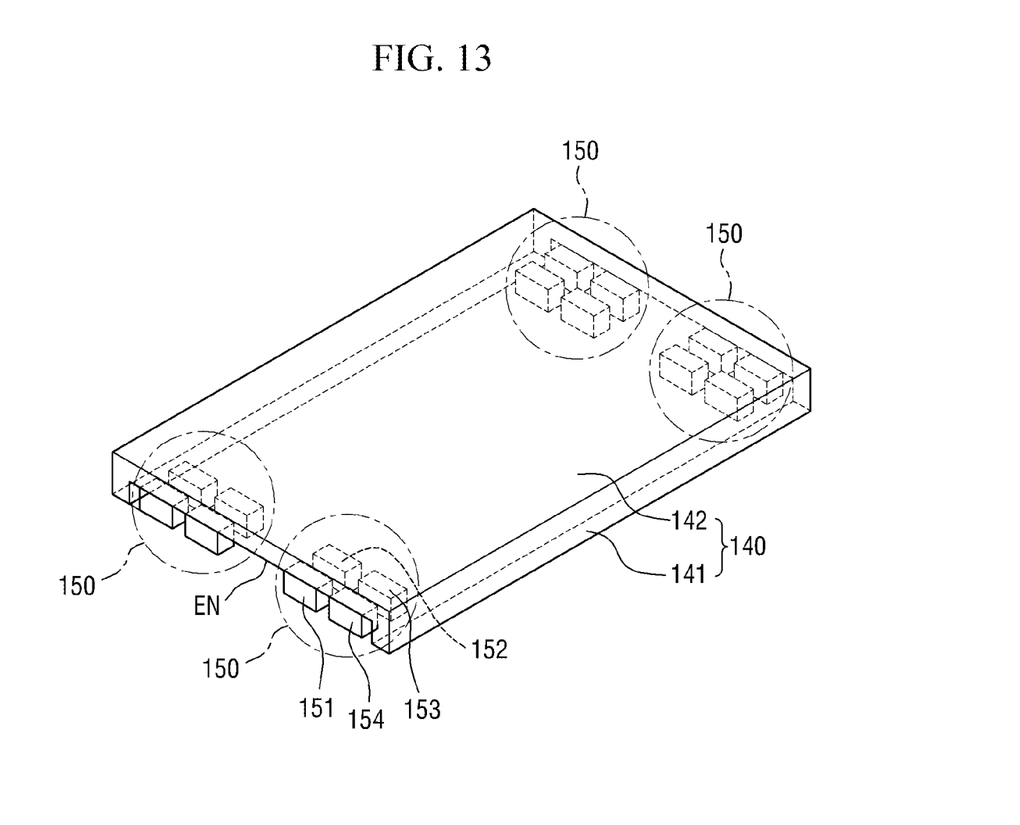
FIG. 13 is a perspective view showing yet still another example of the supporter illustrated in FIG. 6.

FIG. 13 is a perspective view showing yet still another example of the supporter 150 illustrated in FIG. 6.

FIG. 13 exemplifies that the supporter 150 is arranged on both sides of each liquid crystal injection port EN in each of the pixel areas PA. In this case, the roof layer 140 on the portion of the liquid crystal injection port EN can be prevented from drooping more effectively. Further, the filling space FP in which the solid content of the alignment material AM fills is further secured in the supporter 150, and thus the solid content can be effectively prevented from being thickly accumulated on the outer surface of the supporter 150. Accordingly, it can be reduced that the solid content of the alignment material AM is thickly accumulated on the outer surface of the supporter 150, and thus the decrease of the aperture ratio of the pixel area PA and deterioration of the transmission rate can be reduced.

As described above, according to the liquid crystal display 100 according to an embodiment, the supporter 150 that is formed to be divided into a plurality of portions to define the filling space FP is arranged on the liquid crystal injection port EN of the roof layer 140. Thus, the solid content of the alignment material AM can fill in the filling space FP of the supporter 150 in the process of injecting the alignment material AM that includes the solid content and the solvent into the fine space layer CV through the liquid crystal injection port EN.

According to the liquid crystal display 100 according to an embodiment, it can be reduced that the large amount of the solid content of the alignment material AM comes in contact with the outer surface of the supporter 150 due to the surface tension to cause the alignment layer 160 to make a lump. Accordingly, it can be reduced that the solid content of the alignment material AM is thickly accumulated on the outer surface of the supporter 150, and thus the decrease of the aperture ratio of the pixel area PA and deterioration of the transmission rate can be reduced.

In concluding the detailed description, those skilled in the art will appreciate that many variations and modifications can be made to the embodiments without substantially departing from the principles of the inventive concept. Therefore, the disclosed embodiments are used in a generic and descriptive sense only and not for purposes of limitation.

What is claimed is:

1. A liquid crystal display comprising:
    a substrate having a plurality of pixel areas;
    a first electrode on the substrate in each of the pixel areas;
    a fine space layer positioned on the first electrode;
    a roof layer defining the fine space layer between the substrate and the roof layer and including a liquid crystal injection port;
    a second electrode on a bottom surface of the roof layer;
    a supporter on the liquid crystal injection port and divided into a plurality of portions to define a filling space; and
    a thin film transistor electrically connected to the first electrode on the substrate,
    wherein the liquid crystal injection port is positioned on a transistor forming area in which the thin film transistor is positioned.

2. The liquid crystal display of claim 1, wherein each of the portions is in a rectangular prism shape.

3. The liquid crystal display of claim 2, wherein the portions are a same size.

4. The liquid crystal display of claim 2, wherein each of the portions has a horizontal length and a vertical length on a plane, and
    the horizontal length of each of the portions is twice the vertical length of each of the portions.

5. The liquid crystal display of claim 4, wherein the horizontal length of each of the portions is 5 μm, and the vertical length of each of the portions is 2.5 μm.

6. The liquid crystal display of claim 4, wherein outer surfaces of the portions define one rectangle, and
    a gap distance between adjacent portions is shorter than the horizontal length and the vertical length of each of the portions.

7. The liquid crystal display of claim 4, wherein the filling space has a cross shape on the plane.

8. The liquid crystal display of claim 1, wherein the supporter is arranged in a center or on both sides of the liquid crystal injection port.

9. The liquid crystal display of claim 1, wherein the liquid crystal injection port is on one side surface or both side surfaces of the roof layer in each of the pixel areas.

10. The liquid crystal display of claim 1, wherein the number of the portions is four or more.

11. The liquid crystal display of claim 1, wherein each of the portions is in a cylindrical shape.

12. The liquid crystal display of claim 1, wherein the supporter is integral with the roof layer.

13. A liquid crystal display comprising:
    a substrate having a plurality of pixel areas;
    a first electrode on the substrate in each of the pixel areas;
    a fine space layer positioned on the first electrode;
    a roof layer defining the fine space layer between the substrate and the roof layer and including a liquid crystal injection port;

a second electrode on a bottom surface of the roof layer;
a supporter on the liquid crystal injection port and divided into a plurality of portions to define a filling space; and
an alignment layer inside the fine space layer,
wherein the alignment layer includes a main alignment layer covering the first electrode and the second electrode, and a surplus alignment layer filling in the filling space and surrounding outer surfaces of the portions.

14. A liquid crystal display comprising:
a first display layer having a plurality of pixel areas and a first electrode in each of the pixel areas;
a second display layer facing the first display layer and having a second electrode thereon;
a roof layer defining a fine space layer positioned on the first electrode and including a liquid crystal injection port;
a supporter between the first display layer and the second display layer, arranged in each of the pixel areas, and divided into a plurality of portions to define a filling space; and
a thin film transistor electrically connected to the first electrode, wherein the liquid crystal injection port is positioned on a transistor forming area in which the thin film transistor is positioned.

15. The liquid crystal display of claim 14, further comprising an alignment layer between the first display layer and the second display layer,
wherein the alignment layer includes a main alignment layer covering the first electrode and a surplus alignment layer filling in the filling space and surrounding outer surfaces of the portions.

16. The liquid crystal display of claim 14, wherein one or more supporters are arranged in each of the pixel areas.

17. The liquid crystal display of claim 14, wherein each of the portions is in a rectangular prism shape.

18. The liquid crystal display of claim 17, wherein each of the portions has a horizontal length and a vertical length on a plane,
outer surfaces of the portions define one rectangle, and
a gap distance between adjacent portions is shorter than a horizontal length and a vertical length of each of the portions.

19. The liquid crystal display of claim 14, wherein the filling space has a cross shape on a plane.

* * * * *